United States Patent
Oon et al.

(10) Patent No.: US 7,265,749 B2
(45) Date of Patent: Sep. 4, 2007

(54) OPTICAL GENERIC SWITCH PANEL

(75) Inventors: Chin Hin Oon, Penang (MY); Kean Loo Keh, Penang (MY); Fam Hin Chen, Ipoh (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 193 days.

(21) Appl. No.: 11/215,180

(22) Filed: Aug. 29, 2005

(65) Prior Publication Data

US 2007/0046640 A1    Mar. 1, 2007

(51) Int. Cl.
  *G09G 5/00*  (2006.01)
(52) U.S. Cl. ...................... 345/175; 345/176
(58) Field of Classification Search ........... 345/173, 345/175, 176; 178/18.03, 18.09, 18.11; 250/221
See application file for complete search history.

(56) References Cited

U.S. PATENT DOCUMENTS

| | | | | |
|---|---|---|---|---|
| 4,305,071 A | * | 12/1981 | Bell et al. | 345/176 |
| 4,542,375 A | * | 9/1985 | Alles et al. | 345/176 |
| 4,561,017 A | * | 12/1985 | Greene | 348/707 |
| 6,061,177 A | * | 5/2000 | Fujimoto | 359/443 |
| 7,176,905 B2 | * | 2/2007 | Baharav et al. | 345/175 |
| 2003/0081428 A1 | * | 5/2003 | Neta | 362/558 |
| 2004/0252091 A1 | * | 12/2004 | Ma et al. | 345/87 |
| 2005/0200294 A1 | * | 9/2005 | Naugler et al. | 315/149 |
| 2005/0212774 A1 | * | 9/2005 | Ho et al. | 345/173 |
| 2006/0158437 A1 | * | 7/2006 | Blythe et al. | 345/173 |

* cited by examiner

Primary Examiner—Ricardo Osorio

(57) ABSTRACT

A switch panel having a touch plate, image generator, imaging system and light source is disclosed. The touch plate includes an optically transparent layer having first and second surfaces in which a light signal is trapped by internal reflection. The image generator displays an image that includes a plurality of button positions to a person viewing the touch plate from the first surface. When the user touches the front surface at one of the button positions, light from a multi-LED light source that generates the trapped light signal is caused to escape the touch plate at a point corresponding to the point of contact. The light leaving the touch plate is imaged by the imaging system and used to determine the location of the point of contact. Images taken with different LEDs in the light source are used to make the contact determination to reduce the effects of ambient light.

8 Claims, 3 Drawing Sheets

OPTICAL GENERIC SWITCH PANEL

BACKGROUND OF THE INVENTION

Control systems for various apparatuses rely on a plurality of switches to input data to the apparatus. Switch arrays based on mechanical switches mounted on a surface are well known in this regard. Simulated switch arrays that utilize touch screens are also well known. Mechanical switch panels are difficult to reconfigure, and hence, tend to be customized for each application. This substantially increases the cost and product cycle time of devices that utilize such panels.

Input devices based on touch screens provide a convenient method for inputting commands in a manner that is easily reconfigurable. In such devices, the button pattern is displayed on the screen and the user selects a "button" by touching the screen over the button image. Touch screens, however, are significantly more expensive than conventional switches, and hence, are not always feasible for many applications. In addition, the ambient light intensity can interfere with the display that prevents the user from seeing the simulated buttons. Furthermore, the device cannot distinguish between an accidental light touch and an intended button push, since the screens do not provide a measure of the pressure with which the user has pressed his or her finger on the screen.

Many touch screen designs depend on detecting a change in some electrical parameter such as resistivity or capacitance that varies with the location on the screen at which the user touches the screen. Since the observed changes depend on the shape of the screen, custom screen sizes are limited and can require special programming.

A generic switch panel that significantly reduces these problems is disclosed in co-pending U.S. patent application Ser. No. 10/810,157, which is hereby incorporated by reference. In that system, a switch panel is constructed from a touch plate, image generator, and imaging system. The touch plate includes an optically transparent layer having first and second sides. The optically transparent layer having an index of refraction greater than that of air. A light source generates a light signal that is reflected between the first and second sides of the touch plate within the transparent layer. The imaging system records an image of the first surface of the touch plate. When a user presses a finger on the touch plate, a portion of the internally reflected light is reflected toward the second surface at an angle greater than the critical angle and the light escapes the second surface. The location of the bright spot created on that surface is recorded by the imaging system. A simulated button push is then generated based on the location of the detected bright spot.

The light seen by the camera is the sum of the ambient light that passes through the transparent layer and the light from the light source that is reflected out of the transparent layer. In the embodiments discussed in the above-described patent application, the light source and camera are monochromatic. The background is differentiated from the light source by turning the light source on and off, and then creating a difference image by subtracting the image seen by the camera when the light source is off from that seen by the camera when the light source is on. Unfortunately, in environments having high ambient light, this procedure is not always sufficient.

SUMMARY OF THE INVENTION

The present invention includes a switch panel having a touch plate, image generator, imaging system and light source. The touch plate includes an optically transparent layer having first and second sides, the optically transparent layer having an index of refraction greater than that of air. The image generator that displays an image includes a plurality of button positions to a person viewing the touch plate from the first side. The imaging system records a color image of the first surface of the touch plate. The light source generates a light signal that is reflected between the first and second sides of the touch plate within the transparent layer. The light source includes a plurality of LEDs, each LED generating light having a different spectrum than the others of the LEDs. Each LED is turned on in a predetermined sequence such that only one of the LEDs is turned on at a time. A controller receives the images generated by the imaging system and generates an output signal if the touch plate is touched at one of the button positions. In one aspect of the invention, the controller causes the imaging system to record a color position image of the first surface of the touch plate corresponding to each LED when that one of the LEDs is turned on. In another aspect of the invention, the controller causes the imaging system to record a color background image of the first surface of the touch plate when none of the LEDs is turned on, and the controller subtracts the color background image from each of the color position images to form a corrected color position image. The controller combines the corrected color position images to determine if the touch plate has been touched and where the touch panel was touched. In another aspect of the invention, the light signal is perceived to be a constant light signal of a predetermined color by a user viewing the signal. A portion of the light signal exits the first side of the touch plate when a user touches the first side.

DETAILED DESCRIPTION OF THE PREFERRED EMBODIMENTS OF THE INVENTION

Figure 1:
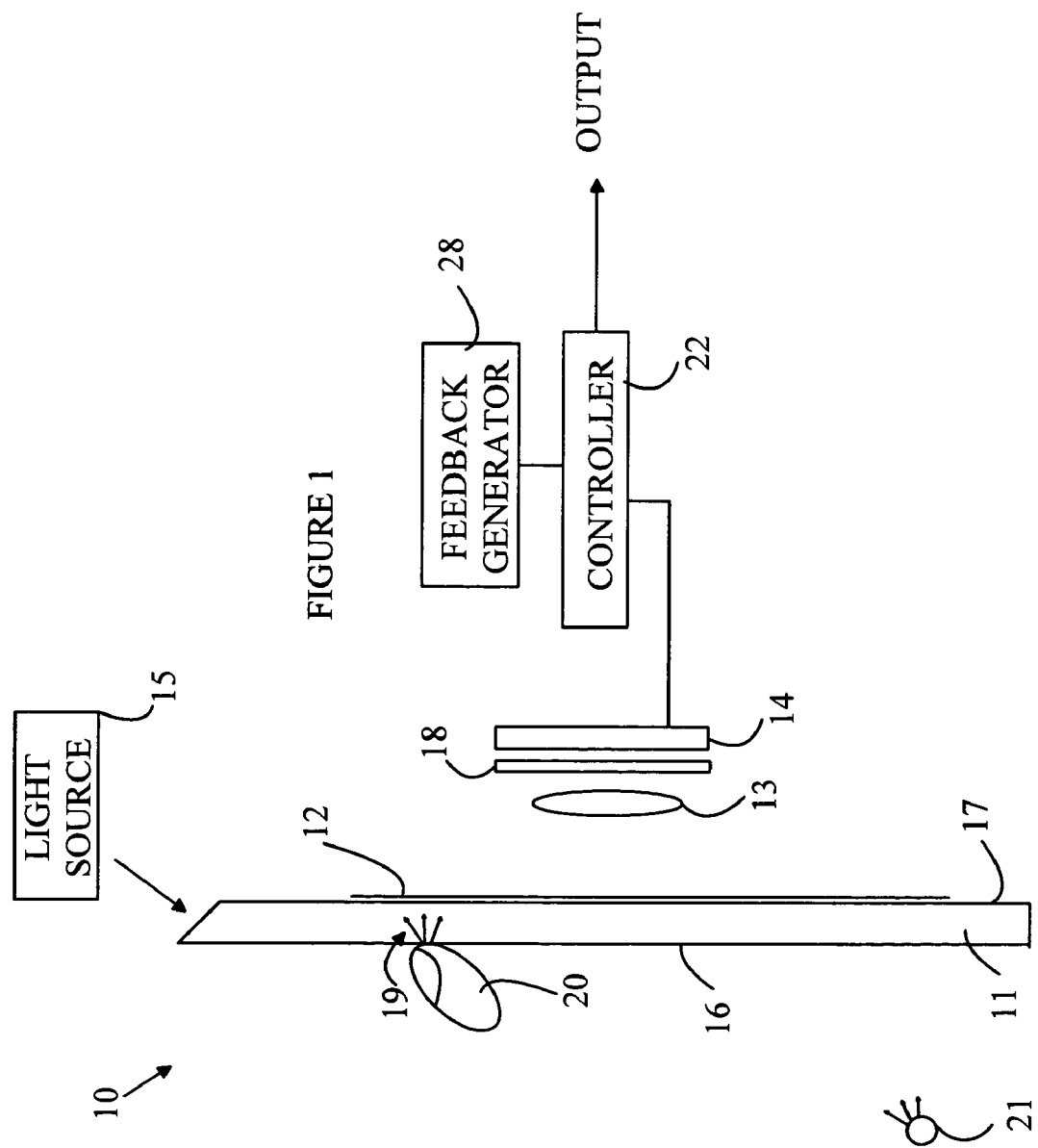
FIG. 1 is a cross-sectional view of a switch panel 10 according to one embodiment of the invention described in the co-pending patent application discussed above.

The manner in which the present invention provides its advantages can be more easily understood with reference to FIG. 1, which is a cross-sectional view of a switch panel 10 according to one embodiment of the invention described in the co-pending patent application discussed above. Switch panel 10 utilizes a transparent screen 11 that emits light at the point of contact when a user presses the user's finger 20 against the screen.

Surface 16 is imaged onto a photodetector array 14 by lens 13. Photodetector array 14 can be constructed from a CCD camera array of the type used in optical mice, inexpensive cameras, or the like. The output of the photodetector array is processed by a controller 22 that generates an output signal indicative of the "button" pushed by the user.

The output "signal" generated by controller 22 can take a number of forms. For example, controller 22 can generate an electrical signal. In addition, controller 22 can include switches and/or relays that are actuated when controller 22 determines that a particular simulated button has been pushed. Further, controller 22 can include a light generator that is actuated to provide a light signal when a particular simulated button is pushed. In addition, some form of feedback signal can be provided by feedback generator 28.

A mask 12 behind screen 11 has pictures of "buttons" and various labels thereon. This mask is visible to the user. The mask is transparent to the light generated by screen 11 when the user touches the screen. The mask may be illuminated with a separate light source 21 to aid the user in visualizing the mask. The light source can be positioned either in front of screen 11 or behind screen 11. For the purposes of this discussion, it is sufficient to note that the wavelength of the illumination light is preferably different from that generated by the user touching screen 11. Hence, any stray illumination light can be easily separated at the photodetector array from the light signals generated by the user touching screen 11.

As noted above, screen 11 emits light when touched by the user. In one embodiment, screen 11 is a plate of glass, plastic, or similar transparent medium that is illuminated by a light source 15 from one end. The illumination angle is chosen such that the light will be internally reflected within the plate, and hence, the light is not visible to the user or the imaging system when so trapped. That is, the light strikes the surfaces of the touch screen at an angle that is less than the critical angle. The critical angle is determined by the index of refraction of the material from which the plate is constructed. The present invention preferably utilizes a material having an index of refraction greater than 1.25.

When the user presses on the surface, the user alters the index of refraction of the plate at the location on surface 16 at which the user's finger makes contact. Some of the light at this location escapes from the surface of the plate and is reflected by the user's finger as shown at 19. Some of this light will strike surface 17 at an angle greater than the critical angle, and hence, escape screen 11 and be imaged onto photodetector array 14.

To distinguish the light generated by the user's touch from other sources of stray light, light source 15 generates light of a predetermined wavelength and the light is turned on and off. A filter 18 over photodetector array 14 is utilized to block light of wavelengths other than this wavelength. In addition, the image used by the controller to determine the location at which the user touched the screen is generated by subtracting an image taken while the light source is turned off from an image taken while the light source is turned on.

This arrangement places limitations on the relative intensities of light sources 15 and 21. If the background light generated by the illumination of mask 12 by light source 21 is much greater than the light from light source 15 that is scattered by the application of the user's finger to layer 11, then the difference image can be too noisy to provide an accurate determination of the position of finger 20. The environment in which the switch panel operates determines the intensity of light source 21, and hence, this problem cannot always be reduced by decreasing the intensity of light source 21 or altering the spectrum of the light to better remove unwanted light using filter 13. Light source 21 must have sufficient brightness to allow the user to see the image on mask 12. Since mask 12 must be transparent at the locations in which the user may press against the plate to simulate a button being pressed, a significant amount of light from source 21 can reach the imaging array.

Since the intensity of light source 21 is fixed by the environment, the designer must increase the intensity of light source 15 to overcome this background light. However, there is a practical limit to the power that can be provided via light source 15. For example, in applications that utilize batteries or other limited power sources, the maximum power that can be provided in light source 15 can be severely limited. In addition, there are limits on the amount of heat that can be dissipated by the switch panel in the region in which light source 15 is located.

Figure 2:
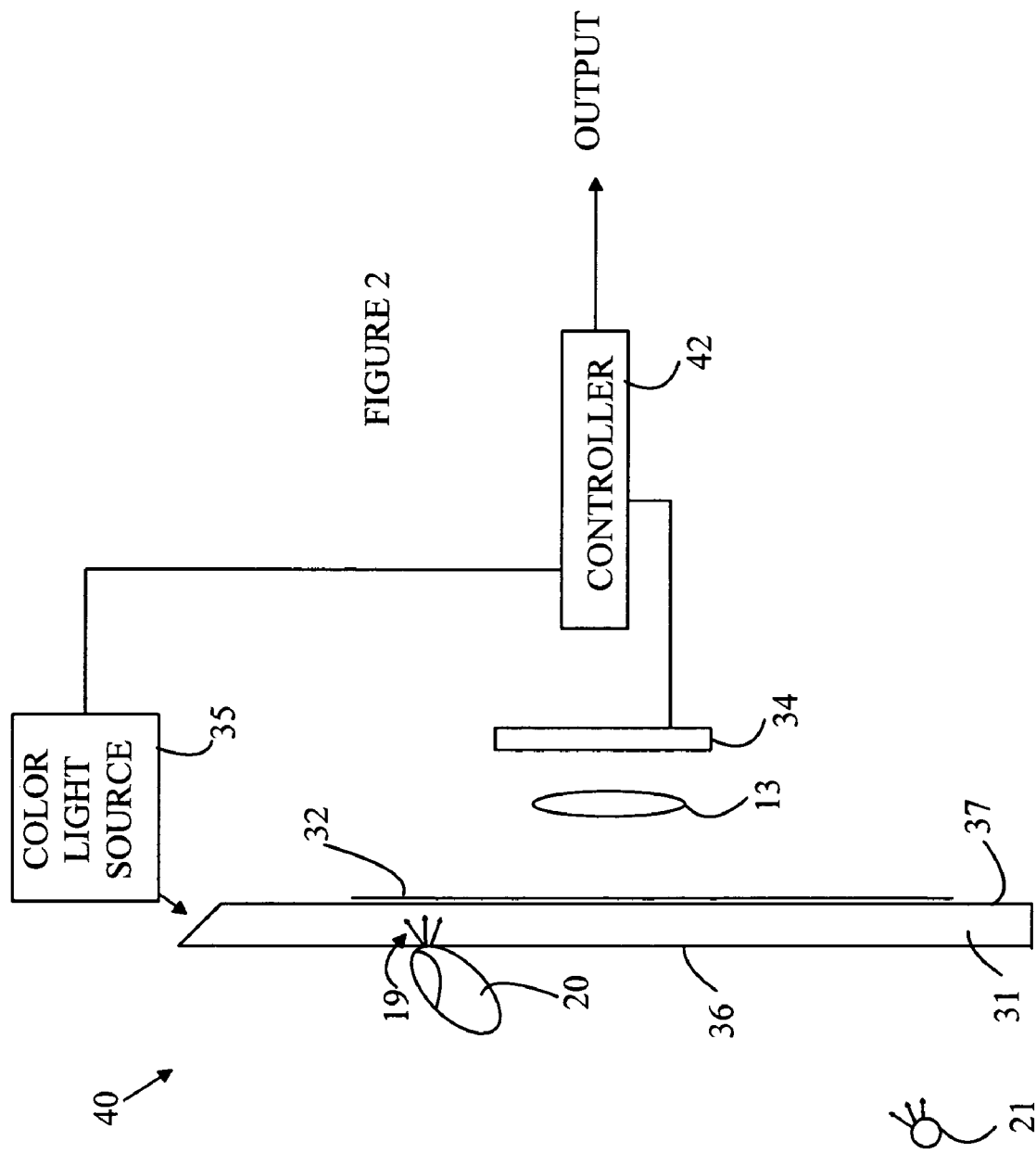
FIG. 2 is a cross-sectional view of a switch panel 40 according to one embodiment of the present invention.

Refer now to FIG. 2, which is a cross-sectional view of a switch panel 40 according to one embodiment of the present invention. Switch panel 40 includes a transparent layer 31 having front and back sides shown at 36 and 37, respectively. A light source 35 injects light into layer 31 in a manner analogous to that discussed above with reference to FIG. 1. When the user applies his or her finger to the top surface 36 of layer 31 some of the light that is trapped between surfaces 36 and 37 is scattered toward surface 37 at angles that allow the light to escape layer 31. The front surface 36 of layer 31 is imaged onto an imaging array 34 by lens 13. Controller 42 processes the image to determine the location at which the user's finger 20 made contact with the screen.

The present invention overcomes the background problem by utilizing a colored light source 35 and a color photodetector array 34. Consider the case in which light source 21 emits blue light and light source 35 emits red light. The photodetector array will record a RGB image. Since the blue source has very little intensity in the red region, the red image can be used to determine if the user has placed a finger on the layer 31. The blue image can be used to identify the place over mask 32 at which the user has placed his or her finger, and hence, each array has an internal position calibration.

In addition, it should be noted that some of the light generated by the user's finger will be reflected from surface 37 backwards toward the user because of the difference in index of refraction between layer 31 and the air in the space between mask 32 and surface 37. This reflected light will appear as a halo around the user's finger. This halo will have the same color as light source 35, which, as noted above, is a different color than the light generated by the illumination of mask 32 by light source 21. This halo provides a visual feedback signal to the user.

In general, the switch panel designer cannot control the spectrum of light source 21. Light source 21 represents the ambient light at the location at which the switch panel is placed as well as the light produced by any internal light source that is part of switch panel 40. While the internal light source can be controlled, the ambient light cannot. Hence, source 21 is likely to vary both in spectral content and intensity over time. At best, it can be assumed that light source 21 and light source 35 have different color spectrums. Light source 35 can be modulated as described above. If light source 21 includes light of all three colors, then controller 42 will record three color images corresponding to each of the color components of light source 21 when light source 35 is off. These three images are then subtracted from the three color images recorded when both light sources are on to provide three corrected images that can be used to determine if finger 20 is present.

The information in the three images can be processed in a number of ways to determine if finger 20 is present. In one embodiment, the image with the greatest contrast is used to determine if finger 20 is present. In another embodiment, a weighted average of the corrected component images is used to determine if finger 20 is present. In yet another embodiment, the correlation between the various corrected component images is computed to determine if finger 20 is present.

In one embodiment of the present invention, light source 35 is constructed from a plurality of LEDs, each LED emitting light of a different color. For the purposes of this discussion, it will be assumed that light source 35 is constructed from three LEDs, and the LEDs emit light in the red, green, and blue regions of the spectrum. The color of the light in layer 31 as perceived by a user when the user touches the layer and views the halo is determined by the average relative intensities of the light from the three LEDs. Consider the case in which each LED is turned on for a short period of time and then turned off. The LEDs are turned on in sequence such that no two LEDs are turned on simultaneously. After each LED has been turned on for its predetermined time period, the LEDs are all set to the off position for a fourth time period, and the process is then repeated. If the time periods are sufficiently short, the observer will perceive a light source that is continuously on with a color determined by the length of time each LED is turned on and by the intensity of light from that LED.

During each of the time periods, controller 42 forms a color image of surface 37 using color-imaging array 34. The color image actually consists of the three component color images corresponding to the red, blue, and green sensors in imaging array 34. The image taken during the period in which all of the LEDs are off forms a background image having component images that can be subtracted from each of the component images taken while one of the LEDs was turned on. The corrected component images generated by this subtraction process can then be used to determine if finger 20 was present. In the present example, there will be 9 such component images, three corresponding to each LED. The images in these corrected component images can be processed as described above.

The images can be processed by a number of methods. For example, the image having the highest contrast can be utilized. In another example, the images can be summed with predetermined weighting factors to provide a combined image that is used to determine if a bright spot appears in the images. In another example, only one of the corrected component images is used, namely the one corresponding to the color of LED that was turned on at the time the image was taken. These three corrected component images can then be summed together in a weighted sum to provide a combined image that can be analyzed for a bright area corresponding to the user's finger.

Figure 3:
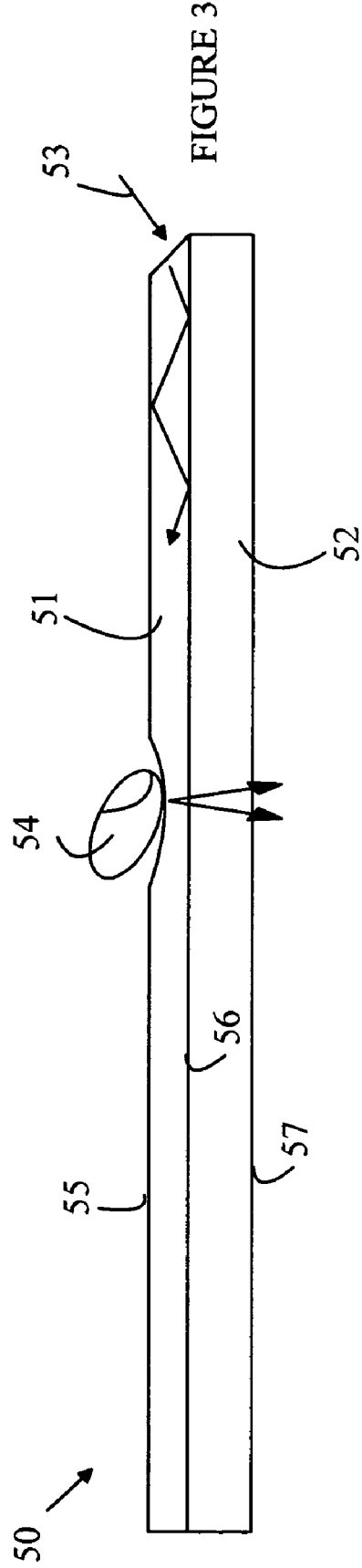
FIG. 3 is a cross-sectional view of a touch plate 50 that utilizes a flexible layer of transparent medium.

The above-described embodiments of the present invention utilize a rigid plate in which light is trapped by internal reflection. These embodiments rely on the interaction of the user's finger and the surface of the touch plate to interrupt the internal reflection of the light. These embodiments are less effective if the object pressed against the plate does not "wet" the surface of the touch plate. The need to wet the surface can be overcome by utilizing a touch plate that has a flexible surface. Refer now to FIG. 3, which is a cross-sectional view of a touch plate 50 that utilizes a flexible layer of transparent medium. Touch plate 50 includes a flexible transparent layer 51 that is bonded to a rigid plate 52. For the purposes of this discussion, it will be assumed that the index of refraction of the material from which layer 51 is constructed is sufficiently different from that of plate 52 that light entering the end of layer 51 as shown at 53 is trapped within the flexible layer. When a user presses on flexible transparent layer 51 as shown at 54, surface 55 of flexible transparent layer 51 is depressed and light is reflected from this depressed surface at an angle greater than the critical angle, and hence, escapes both layers 51 and 52.

It should be noted that layers 51 and 52 can also be made from materials with nearly the same index of refraction. In this case, the boundary 56 between the layers will not reflect light. Instead, the light will be trapped between surfaces 55 and 57. However, the light will still be reflected by the depression in surface 55 created by the user pressing on the surface, and hence, such embodiments will also function. Surface 55 can also be coated with a partially reflecting material to enhance the reflection of light at the point of depression.

Various modifications to the present invention will become apparent to those skilled in the art from the foregoing description and accompanying drawings. Accordingly, the present invention is to be limited solely by the scope of the following claims.

What is claimed is:

1. A switch panel comprising:
   a touch plate comprising an optically transparent layer having first and second surfaces, said optically transparent layer having an index of refraction greater than that of air;
   an image generator that displays an image comprising a plurality of button positions to a person viewing said touch plate from said first surface;
   an imaging system that records a color image of said first surface of said touch plate;
   a controller that receives said image and that generates an output signal if said touch plate is touched at one of said button positions; and
   a light source that generates a light signal that is reflected between said first and second surfaces of said touch plate within said transparent layer, said light source comprising a plurality of LEDs, each LED generating light having a different spectrum than the others of said LEDs, each LED being turned on in a predetermined sequence such that only one of said LEDs is turned on at a time.

2. The switch panel of claim 1 wherein said controller causes said imaging system to record a color position image of said first surface of said touch plate corresponding to each LED when that one of said LEDs is turned on.

3. The switch panel of claim 2 wherein said controller causes said imaging system to record a color background image of said first surface of said touch plate when none of said LEDs is turned on, and wherein said controller subtracts said color background image from each of said color position images to form a corrected color position image.

4. The switch panel of claim 3 wherein said controller combines said corrected color position images to determine if said touch plate has been touched and where said touch panel was touched.

5. The switch panel of claim 1 wherein said light signal is perceived to be a constant light signal of a predetermined color by a user viewing said signal.

6. The switch panel of claim 5 wherein a portion of said light signal exits said first surface of said touch plate when a user touches said first surface.

7. The switch panel of claim 1 wherein a portion of said light signal is reflected toward said second surface at an angle greater than the critical angle in said optically transparent layer when said first surface is touched with a force greater than a predetermined force.

8. The switch panel of claim 1 wherein said first surface deforms sufficiently when a predetermined pressure is applied thereto to cause a portion of said light signal to be reflected toward said second surface at an angle greater than the critical angle in said optically transparent layer.

* * * * *